(12) United States Patent
Hong et al.

(10) Patent No.: US 8,973,852 B2
(45) Date of Patent: Mar. 10, 2015

(54) METHOD FOR PREPARING A CATHODE MATERIAL FOR LITHIUM SECONDARY BATTERY

(71) Applicant: Institute for Advanced Engineering, Seoul (KR)

(72) Inventors: Hyun Soen Hong, Seoul (KR); Yun-Ho Jin, Seoul (KR); Kun Jae Lee, Seoul (KR)

(73) Assignee: Institute for Advanced Engineering, Seoul (KR)

( * ) Notice: Subject to any disclaimer, the term of this patent is extended or adjusted under 35 U.S.C. 154(b) by 318 days.

(21) Appl. No.: 13/653,496

(22) Filed: Oct. 17, 2012

(65) Prior Publication Data

US 2014/0034761 A1 Feb. 6, 2014

(30) Foreign Application Priority Data

Jul. 31, 2012 (KR) .................. 10-2012-0083638

(51) Int. Cl.
*B02C 19/00* (2006.01)
*H01M 4/04* (2006.01)
*H01M 4/13* (2010.01)
*H01M 4/485* (2010.01)
*C01B 33/20* (2006.01)

(52) U.S. Cl.
CPC .............. *H01M 4/0471* (2013.01); *H01M 4/13* (2013.01); *H01M 4/485* (2013.01); *C01B 33/20* (2013.01); *Y02E 60/122* (2013.01)
USPC .................................. 241/21; 241/22; 241/23

(58) Field of Classification Search
CPC ..... H01M 4/0471; H01M 4/13; H01M 4/485; C01B 33/20; Y02E 60/122; B02C 19/00; B02C 19/00056
USPC .................................................. 241/21, 22, 23
See application file for complete search history.

(56) References Cited

U.S. PATENT DOCUMENTS

2011/0291055 A1   12/2011   Kojima et al.

FOREIGN PATENT DOCUMENTS

KR   10-2011-0111433   10/2011

OTHER PUBLICATIONS

Illias Belharouak, A. Abouimrane et al, "Structural and Electrochemical Characterization of Li2MnSiO4 Cathode Material", J. Phys. Chem. C 2009, 113(48), pp. 20733-20737.
Yi-Xiao Li et al, "Synthesis and characterization of Li2MnSiO4/C nanocomposite cathode material for lithium ion batteries", Journal of Power Sources vol. 174, Issue 2, Dec. 6, 2007, pp. 528-532.
Wengang Liu et al, "Synthesis, characterization and electrochemical performance of Li2MnSiO4/C cathode material by solid-state reaction", Journal of Alloys and Compounds vol. 480, Issue 2, Jul. 8, 2009, pp. L1-L4.

*Primary Examiner* — Mark Rosenbaum
(74) *Attorney, Agent, or Firm* — Bacon & Thomas, PLLC

(57) ABSTRACT

Disclose is a method for preparing a cathode material for a lithium secondary battery, the method comprising the steps of: preparing an amorphous silicon oxide; using the prepared silicon oxide as a starting material; and milling the amorphous silicon oxide, a lithium silicon oxide and a transition metal silicon oxide at a predetermined ratio, drying the milled material, and heat-treating the dried material in an atmosphere of inert gas, thereby preparing a lithium transition metal silicon oxide.

5 Claims, 4 Drawing Sheets

METHOD FOR PREPARING A CATHODE MATERIAL FOR LITHIUM SECONDARY BATTERY

FIELD OF THE INVENTION

The present invention relates to a method for preparing a lithium metal silicon oxide as a cathode material for a lithium secondary battery, and more particularly, to a preparation method comprising preparing an amorphous silicon oxide and preparing a lithium metal silicon oxide using the amorphous silicon oxide as a starting material.

BACKGROUND OF THE INVENTION

As is well known in the art, lithium ion batteries are recognized as a technology capable of satisfying the requirements all portable devices, including mobile phones, digital cameras, notebook computers and the like, unlike existing batteries, including lead secondary batteries, nickel-cadmium secondary batteries and the like.

In such lithium ion batteries, cathode active materials have the highest added value and constitute the key technology of the lithium ion batteries.

Layered spinel structures such as lithium cobalt oxide ($LiCoO_2$) typical of currently commercially available cathode materials show a high theoretical capacity of 270 mAh/g or higher when 1 mole of lithium reacts. However, in practice, only 0.5 moles of lithium are reacted due to the shortcoming of structural bonds, and thus the theoretical capacity is limited to about 140 mAh/g.

In addition, materials having an olivine structure, such as lithium iron phosphate ($LiFePO_4$), are limited to a theoretical capacity of about 170 mAh/g because of their the high molecular weight of polyphosphate anions. Also it has very low conductivity so that it needs further process for enhance its electrochemical conductivity.

Thus, for application to various devices requiring high performance, the development and use of high-capacity cathode materials is urgently required.

Recently developed lithium transition metal silicon oxides ($Li_2MSiO_4$, M=Fe, Ni, Co, Mn etc.) as cathode materials for lithium secondary batteries have 2 moles of lithium and show a high theoretical capacity of 300 mAh/g or higher. Thus, these oxides can provide high capacities compared to other conventional oxides and are receiving a great deal of attention.

Meanwhile, cathode materials for secondary batteries are produced in large amounts by solid-phase reaction methods. In addition, when cathode materials are synthesized by liquid-phase reaction methods, including hydrothermal synthesis and sol-gel methods, it is easy to control particle size and they have excellent electrochemical properties. However, it is very difficult to commercially apply these liquid-phase reaction methods, because starting material costs and process costs are high.

In general solid-phase reaction methods, a solid lithium compound ($Li_2CO_3$, LiOH or $Li_2SiO_3$), a metal compound ($FeC_2O_4$, $MnC_2O_4$, $MnCO_3$, $MnO_2$, $Mn_3O_4$, $Mn(OH)_2$, NiO or $Ni(OH)_2$) and silica ($SiO_2$) as starting materials are combined and wet- or dry-mixed with each other, and the mixture is calcined at a temperature of 1000° C. or higher, thereby preparing a cathode material.

Although high-temperature heat-treatment is inevitable due to the starting material silica that is very stable even at high temperature, significant amounts of secondary phases ($Li_2SiO_3$, $MnSiO_4$, $FeSiO_4$, NiO, $MnO_2$, $MnO_3$ etc.) are present in addition to the lithium metal silicon oxide.

Such secondary phases either do not react with lithium ions or plug lithium-ion migration channels, thus deteriorating the performance of lithium secondary batteries.

Conventional solid-phase methods are generally divided into two methods. One method comprises synthesizing a lithium silicon oxide ($Li_2SiO_3$) which is used as a starting material. In this method, to prepare the lithium silicon oxide, heat-treatment is carried out at 400-600° C. for about 30 hours in the presence of carbon dioxide ($CO_2$) and reducing gas ($H_2$) to synthesize lithium silicon oxide powder which is used as a precursor. The synthesized precursor is heat-treated together with manganese oxalate ($MnC_2O_3$) in an argon atmosphere.

Other methods include a method comprising a lithium transition metal oxide ($Li_xMO_x$) at 550-750° C., mixing the lithium transition metal oxide with silicon oxide and subjecting the mixture to solid-phase synthesis. This method is less applicable in synthesis of cathode materials for lithium secondary batteries.

Patent documents which are searched in connection with the background of the invention mostly use crystalline silica as a starting material, resulting in the formation of secondary phases which do not react with lithium ions. Alternatively, these patent documents use expensive lithium silicon oxide ($Li_2SiO_3$), and thus are not economical.

Particularly, because methods based on solid-phase methods comprise preparing lithium silicon oxide ($Li_2SiO_3$) which is to be used as a starting material, these methods have a shortcoming in that a mixed gas of inert gas and reducing gas is additionally required, making the preparation of the starting material complex and uneconomical.

Other methods include a method in which solid-phase synthesis is performed using oxalate as a starting material. This method can adversely affect the environment when heat treatment is carried out using carbon dioxide ($CO_2$) during the preparation of lithium transition metal silicon oxide.

Accordingly, in these conventional methods, additional reaction materials should be used. Due to the use of these additional reaction materials, the process becomes inefficient and can be risky, and the production cost is increased, and also problems associated with the preparation and treatment of these additional materials occur. Particularly, the above-described solid phase methods are difficult to apply to devices requiring high performance, because it is difficult to control the particle size of synthesized powders.

SUMMARY OF THE INVENTION

Therefore, it is an object of the present invention to provide a method for preparing a cathode material for a lithium second battery, in which a cathode active material for a lithium secondary battery can be prepared using an amorphous silicon oxide.

To achieve the above object, in one aspect, the present invention provides a method for preparing a cathode material for a lithium secondary battery, the method comprising the steps of: preparing an amorphous silicon oxide; using the prepared silicon oxide as a starting material; and milling the amorphous silicon oxide, a lithium silicon oxide and a transition metal silicon oxide at a predetermined ratio, drying the milled material, and heat-treating the dried material in an atmosphere of inert gas, thereby preparing a lithium transition metal silicon oxide.

The amorphous silicon oxide may be used as a starting material for a cathode material for a lithium-ion battery to increase reactivity.

The amorphous silicon oxide may be applied to a solid-phase method and a liquid-phase method.

The step of preparing the amorphous silicon oxide may comprise adding chloride or acetate as a starting material, and drying and heat-treating the resulting material.

The transition metal (M) may be selected from among cobalt (CO), iron (Fe), manganese (Mn), nickel (Ni) and titanium (Ti).

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Figure 1:
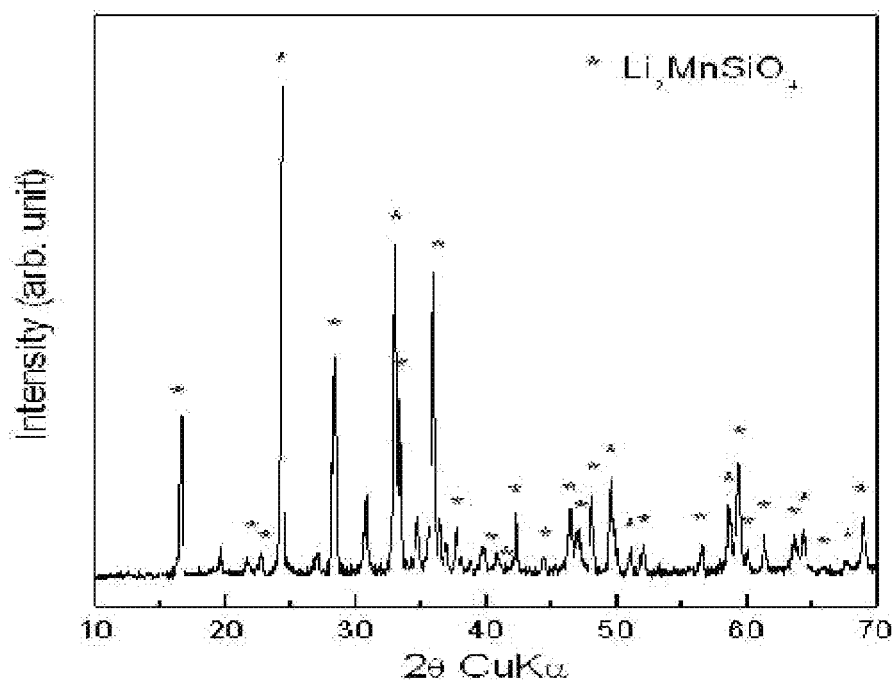
FIG. 1 is a graphic diagram showing the results of XRD diffraction analysis of a lithium manganese silicon oxide synthesized by a method for preparing a cathode material for a secondary battery according to one embodiment of the present invention.

Hereinafter, exemplary embodiments of the present invention will be described in detail with reference to the accompanying drawings. Further, when it is determined that detailed description relating to well-known functions or configurations may make the subject matter of the present invention unnecessarily ambiguous, the detailed description will be omitted. In addition, terms to be described below have been defined in consideration of functions in the present invention, and may be defined differently depending on a user or operator's intension or practice. Therefore, the definitions of such terms are based on the descriptions of the entire present specification.

A method for preparing a cathode material for a lithium secondary battery according to one embodiment of the present invention is characterized in that an amorphous silicon oxide is prepared and used.

In the case of, for example, lithium transition metal silicon oxide ($Li_2MSiO_4$) reported to show the frequent appearance of secondary phases, there are problems in that the reactivity between materials is low, and it is difficult to inhibit the appearance of secondary phases caused by side reactions, and also such secondary phases cause side reactions during operation of lithium secondary batteries, resulting in a decrease in the battery capacity. Thus, a method for preparing a cathode material for a lithium secondary battery according to one embodiment of the present invention overcomes such problems and, at the same time, presents an example which can be used in the preparation of starting materials for cathode active materials.

One embodiment of the present invention can be applied directly to a current process for preparing a cathode material for a lithium secondary battery to prepare a lithium transition metal silicon oxide.

Specifically, crystalline silica that is generally used is not used, and amorphous silica powder is prepared using an inexpensive silicon polymer compound and may be used as a starting material for preparing a transition metal silicon oxide for lithium secondary batteries.

Thus, according to the embodiment of the present invention, the formation of secondary phases which do not react with lithium ions can be suppressed or the need for the use of expensive lithium silicon oxide ($Li_2SiO_3$) can be eliminated.

The problems occurring in the prior art can be overcome by using lithium carbonate, hydroxide or chloride and transition metal chloride, carbonate or oxalate together with the amorphous silicon oxide as starting materials.

As described above, a method for preparing a cathode material for a lithium secondary battery according to one embodiment of the present invention uses the high reactivity of the amorphous silicon oxide, and thus is a significantly improved technology over the prior art and can be used in a wide range of applications.

In addition, when synthesis is performed by a general sol-gel method using various starting materials, including not only a carbonate-based compound for a solid phase method, but also chloride and acetate which easily dissolve in deionized water, together with the amorphous silicon oxide obtained by the method of the present invention, a cathode active material having a smaller size can be synthesized and applied to a cathode material for lithium ion batteries.

More specifically, a cathode material can be synthesized by dispersing the synthesized amorphous silicon oxide in deionized water, adding the dispersion to a solution of lithium acetate and manganese acetate, reacting the mixture with ethylene glycol at 60° C. for 24 hours, and then heat-treating the resulting powder at a temperature of 700~900° C. in an inert gas atmosphere (Ar or Ar+5 wt % $H_2$).

A method according to one embodiment of the present invention may comprise the steps of: 1) preparing a silicon oxide; 2) using the prepared silicon oxide as a starting material; and 3) preparing a cathode material for a lithium secondary battery.

According to the following example, the present inventor carried out the preparation of a silicon oxide and the synthesis of a cathode material for a lithium secondary battery.

First, an amorphous silicon oxide precursor was synthesized.

Specifically, 30 ml of TEOS (tetraethyl orthosilicate), 30 ml of ethanol, 4.8 ml of deionized water and 2 ml of hydrochloric acid (30-35%) were kept at 90° C. for 1 hour. Thus, the viscosity of the solution increased to form a gel. Herein, the ratio of $H_2O$/TEOS is about 2. This ratio is a parameter determining the reaction time, and if the ratio is more than 2, the volatilization rate of ethanol will be very high, and thus the reaction time becomes shorter, and if the ratio is less than 2, the reaction time becomes longer. In this Example, the ratio may be more than 2.

Then, the resulting material was dried at 70° C. and heat-treated at 650° C. for 2 hours, thereby forming an amorphous silicon oxide. This heat treatment at 650° C. was carried out in order to remove organic materials adsorbed onto the silicon oxide and to make the amorphous silicon oxide pure. Thus, this heat treatment may not be carried out.

Then, the synthesized amorphous silicon oxide was used as a precursor and milled together with lithium carbonate ($Li_2CO_3$) and manganese carbonate ($MnCO_3$) at a predetermined ratio for 12 hours using zirconia balls, followed by drying. Herein, in place of manganese carbonate, another transition metal carbonate ($FeC_2O_4$ or $CoCO_3$), oxalate or oxide may be used.

Then, the resulting material was maintained in an inert gas atmosphere at 700-900° C. for 10 hours.

Figure 2:
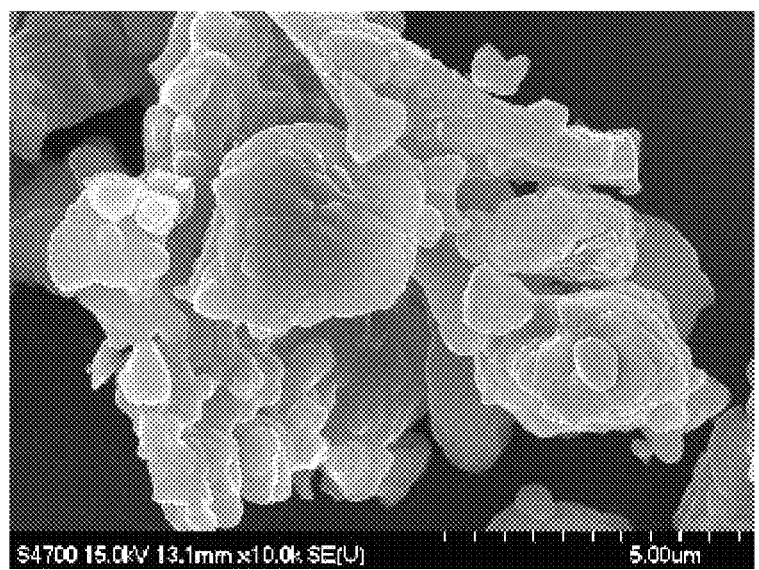
FIG. 2 is a photograph showing the results of SEM analysis of the lithium manganese silicon oxide synthesized by the method of FIG. 1.

The heat-treated sample was analyzed by an X-Ray diffractormeter (XRD) and a scanning electron microscope (SEM). As a result, as can be seen in FIGS. 1 and 2, the yield of the primary phase lithium manganese silicon oxide ($Li_2MnSiO_4$) was about 95% or more.

Comparative Example

For comparison with the above example, a commercially available crystalline silicon oxide was used as a starting material and subjected to a solid-phase process. The resulting material was milled using zirconia for 12 hours and heat-treated at 900° C. in an argon atmosphere, followed by analysis.

Figure 3:
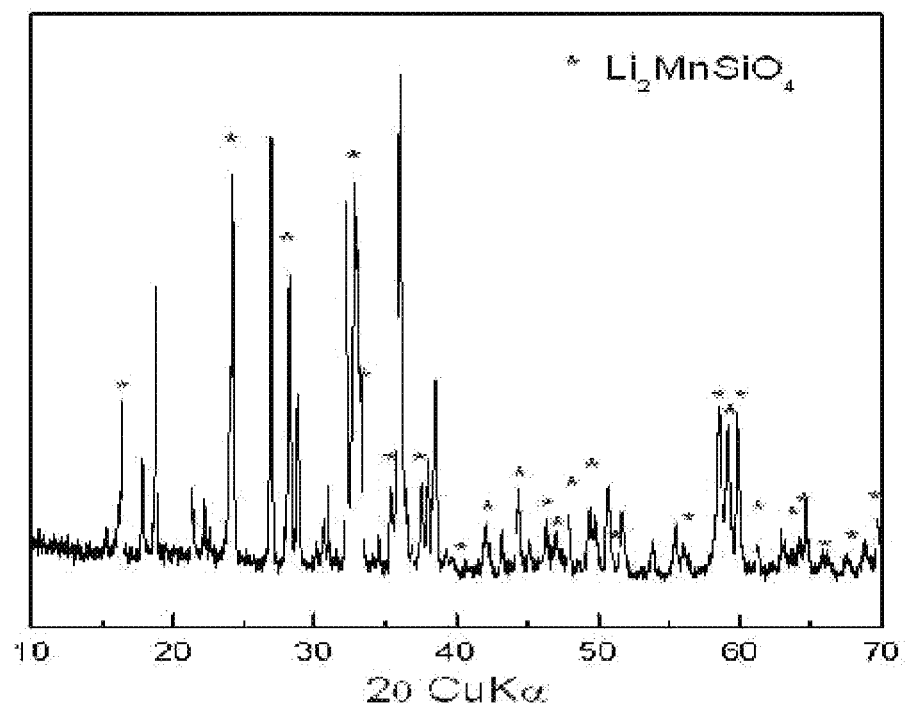
FIG. 3 is a graph showing the results of XRD diffraction analysis of a lithium manganese silicon oxide synthesized by a method of the comparative example.
Figure 4:
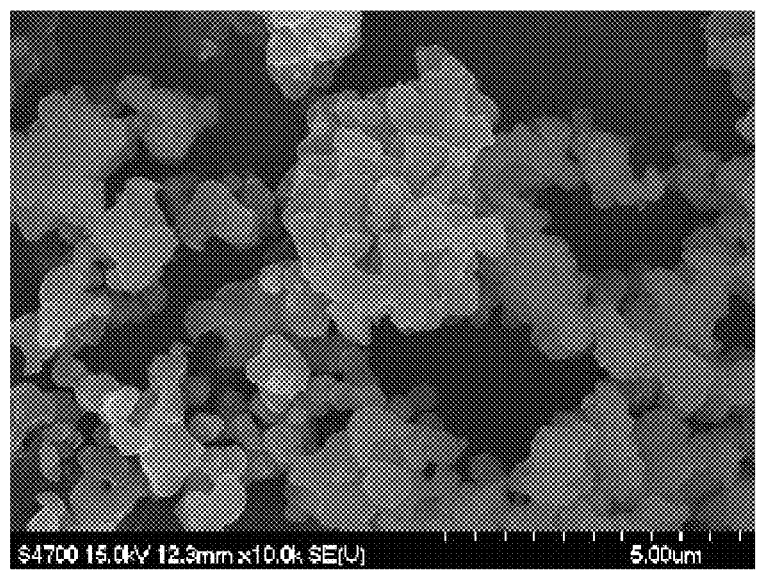
FIG. 4 is a photograph showing the results of SEM analysis of the lithium manganese silicon oxide synthesized by the method of FIG. 3.

As a result, as can be seen in FIGS. 3 and 4, the ratios of secondary phases, including lithium silicon oxide ($Li_2SiO_3$) and manganese silicon oxide ($MnSiO_3$), were very high.

As described above, the inventive method for preparing a cathode material for lithium secondary batteries enables an amorphous silicon oxide to be used in an economical manner in various applications. In addition, a cathode material prepared using the silicon compound has a theoretical capacity of 330 mAh/g which is higher than those of the layered spinel structures and olivine-based composite structures described in the prior art. Also, it is a material which can be continuously developed.

In addition, the method of preparing and using an amorphous silicon oxide may also be applied to a solid-phase process and a liquid-phase process. Also, technology using this amorphous silicon oxide as a precursor can further be developed and is very excellent and can also be applied to various industries.

Further, the powder obtained by the above solid phase process may be mixed with powder obtained by a liquid phase process at a specific ratio to achieve high rate capability, which can be seen in nano-sized powder, high tap density and excellent surface-modified properties. Thus, the powder can be applied to devices requiring high performance.

According to one embodiment of the present invention, crystalline silica that is generally used is not used as a starting material, and amorphous silica powder is prepared using an inexpensive silicon polymer compound and may be used as a starting material for preparing a transition metal silicon oxide for secondary batteries. The amorphous precursor material is highly reactive with other precursors during a synthesis reaction, compared to a crystalline material, and thus makes it possible to suppress the formation of secondary phases which do not react with lithium ions. Further, the embodiment of the present invention is economical, because it does not use expensive lithium silicon oxide ($Li_2SiO_3$).

In addition, according to one embodiment of the present invention, lithium carbonate, hydroxide or chloride and transition metal chloride, carbonate or oxalate may be used as starting materials together with the amorphous silicon oxide having excellent reactivity.

Additionally, according to the embodiment of the present invention, not only a carbonate-based material for a solid-phase process, but also chloride or acetate can be used as starting materials, making it possible to apply the economical liquid-phase process. Thus, a cathode material having a smaller particle size can be synthesized and applied to a cathode material for a lithium ion battery, thus increasing the performance of the battery.

The foregoing is merely one preferred example of the inventive method for preparing a cathode material for a secondary battery, and the scope of the present invention is not limited to the above embodiment. Thus, those skilled in the art will appreciate that various modifications, additions and substitutions are possible, without departing from the scope and spirit of the invention as disclosed in the accompanying claims.

What is claimed is:

1. A method for preparing a cathode material for a lithium secondary battery, the method comprising the steps of:
    preparing an amorphous silicon oxide;
    using the prepared silicon oxide as a starting material; and
    milling the amorphous silicon oxide, a lithium silicon oxide and a transition metal silicon oxide at a predetermined ratio, drying the milled material, and heat-treating the dried material in an atmosphere of inert gas, thereby preparing a lithium transition metal silicon oxide.

2. The method of claim 1, wherein the amorphous silicon oxide is used as a starting material for a cathode material for a lithium-ion battery to increase reactivity.

3. The method of claim 1, wherein the amorphous silicon oxide is applied to a solid-phase method and a liquid-phase method.

4. The method of claim 1, wherein the step of preparing the amorphous silicon oxide comprises adding chloride or acetate as a starting material, and drying and heat-treating the resulting material.

5. The method of claim 1, wherein the transition metal (M) is selected from among cobalt (CO), iron (Fe), manganese (Mn), nickel (Ni) and titanium (Ti).

* * * * *